United States Patent
Tashiro et al.

(10) Patent No.: US 6,901,497 B2
(45) Date of Patent: May 31, 2005

(54) PARTITION CREATING METHOD AND DELETING METHOD

(75) Inventors: Koji Tashiro, Kanagawa (JP); Teiji Yutaka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 457 days.

(21) Appl. No.: 10/033,157

(22) Filed: Oct. 26, 2001

(65) Prior Publication Data

US 2002/0147900 A1 Oct. 10, 2002

(30) Foreign Application Priority Data

Oct. 27, 2000 (JP) .......................... 2000-328453
Oct. 26, 2001 (JP) .......................... 2001-328903

(51) Int. Cl.$^7$ .............................................. G06F 12/00
(52) U.S. Cl. ...................... 711/173; 711/112; 345/544
(58) Field of Search ................................ 711/112, 127, 711/170–173, 153, 129; 345/543, 544; 707/205

(56) References Cited

U.S. PATENT DOCUMENTS

| | | | | |
|---|---|---|---|---|
| 6,032,160 A | * | 2/2000 | Lehman | 707/205 |
| 6,032,239 A | | 2/2000 | Beelitz | |
| 6,088,778 A | * | 7/2000 | Ruff et al. | 711/173 |
| 6,185,666 B1 | * | 2/2001 | Murray et al. | 711/173 |
| 6,490,670 B1 | * | 12/2002 | Collins et al. | 711/173 |
| 6,505,284 B1 | * | 1/2003 | Rabinovici et al. | 711/170 |
| 6,532,517 B1 | * | 3/2003 | Wagner et al. | 711/112 |
| 6,658,437 B1 | * | 12/2003 | Lehman | 707/205 |

FOREIGN PATENT DOCUMENTS

| | | |
|---|---|---|
| JP | 6139703 | 5/1994 |
| JP | 9160815 | 6/1997 |
| JP | 11-238317 A1 | 8/1999 |
| TW | 394874 A1 | 6/2000 |

* cited by examiner

Primary Examiner—Pierre M. Vital
(74) Attorney, Agent, or Firm—Lerner, David, Littenberg, Krumholz & Mentlik, LLP

(57) ABSTRACT

A size of a partition to be created on a storage device is limited to a size of m to n-th power, where m and n are natural numbers. In creation of the partition, a partition management execution unit is set to dispose the partition from a sector aligned with a size of the partition itself, thereby improving the utilization efficiency of the storage device can be improved.

11 Claims, 8 Drawing Sheets

| ID (1031) | STARTING SECTOR NUMBER (1032) | SIZE (1033) | STATUS (1034) |
|---|---|---|---|
| 1 | ... | ... | DEFINED |
| 2 | ... | ... | UNDEFINED |
| 3 | ... | ... | DEFINED |
| ⋮ | ⋮ | ⋮ | ⋮ |

PARTITION CREATING METHOD AND DELETING METHOD

BACKGROUND OF THE INVENTION

The present invention relates to a management technology of a storage device, particularly to a technology of managing creation and deletion of a partition of a hard disk device.

In a storage device, particularly in a hard disk, the setting of partitions makes it possible to physically use one hard disk as if it were separate hard disks. It is therefore an actual practice to divide a hard disk having a large capacity into a plurality of partitions, for facilitating management of the disk or enabling the booting up of a plurality of OSs by switching one OS to another. Further, the partitions are also used for the purpose of preventing a decrease in a processing speed, which is caused by an occurrence of so-called fragmentation. To this end, files to be frequently opened for reading and writing, and system files and the like to be altered to a less degree are recorded in separate partitions.

When a user conducts partition alteration, conventionally, the user employs a utility program or the like to manually add or delete partitions . That is, when the user adds a partition, the user takes account of a necessary partition size and a securable region on a hard disk to determine the position of partition to be created.

In practice, however, partition alteration has not been performed very frequently. The alteration has been limited, for example, to the case of adding a hard disk, the case of changing operation systems, and the like.

However, there are demands for adding and deleting a partition for enlargement of a hard disk capacity, diversification of operation systems, addressing a necessity to handle files having various properties.

In such a case, if the addition and deletion of the partitions are repeated in a disorderly way, the hard disk is fragmented into minute partitions, which may lower the utilization efficiency of a hard disk device.

SUMMARY OF THE INVENTION

It is an object of the present invention to provide a technology for improving the utilization efficiency of a storage device.

For achieving the above and/or other objects, a method of creating a partition in a storage device, provided by the present invention, comprises limiting the size of a partition to be created to a size of m to the n-th power where m and n are natural numbers, and disposing the partition to be created in a position aligned by the size of the partition.

DETAILED DESCRIPTION OF THE INVENTION

Embodiments of the present invention will be explained in detail with reference to the drawings.

Figure 1:
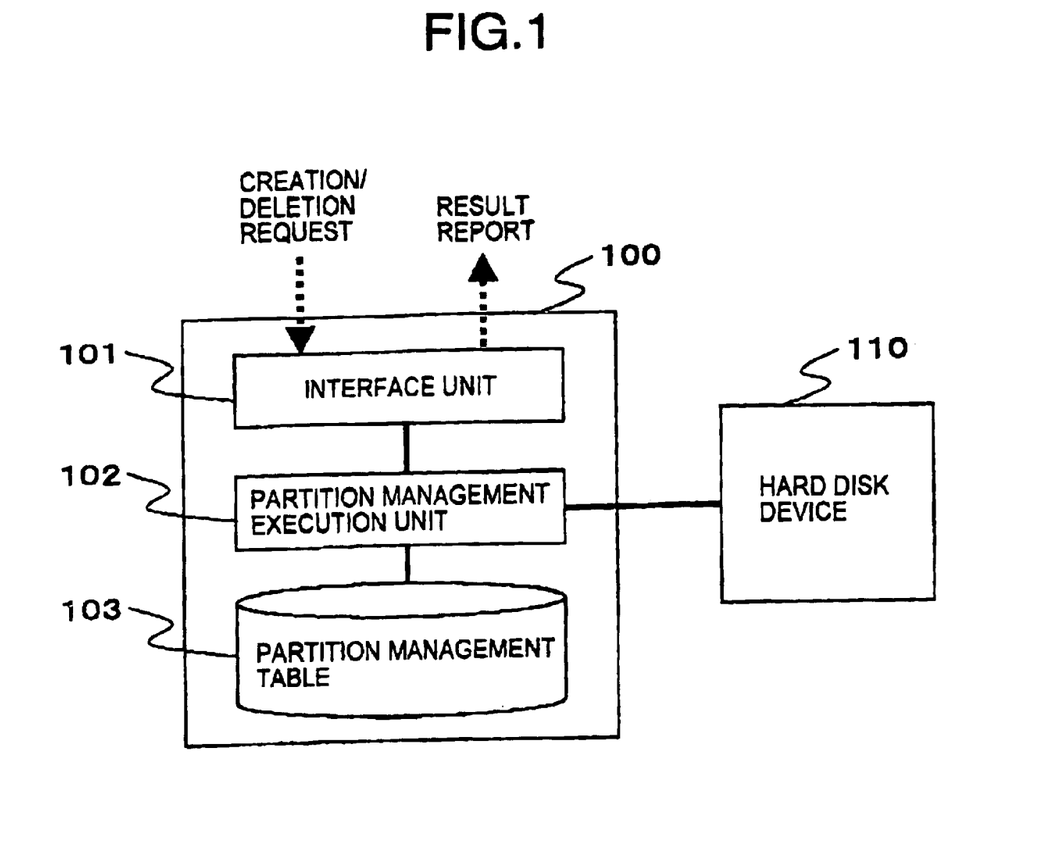
FIG. 1 is a block diagram showing a configuration of one embodiment of the partition management system according to the present invention.

FIG. 1 is a block diagram showing a configuration of one embodiment of a partition management system according to the present invention. In this drawing, a partition management system 100 includes an interface unit 101 for receiving a program under execution, a request for adding a partition and a request for deleting a partition from an operator or the like and sending results of processing the same back thereto. The partition management system 100 also includes a partition management execution unit 102 for executing addition and deletion of a partition in a mounted storage device and performing creation and renewal of a partition management table. The partition management system 100 also includes a partition management table 103. In this embodiment, a hard disk 110, as one example of the storage device, is mounted in the partition management system 100.

The partition management execution unit 102 includes: a central processing unit (CPU), a main storage device, a reading device for reading data from a portable storage medium, such as a CD-ROM or DVD-ROM, an input device such as a keyboard, a mouse and a controller, a display device, and an interface for controlling transmission and reception of data among the above-described constituent components. The partition management system 100 can be implemented using a generally configured information processing apparatus capable of internally or externally mounting the storage device, such as a hard disk. The information processing apparatus may be, for example, a personal computer, a server computer or an entertainment apparatus.

Further, a program for commanding the information processing apparatus to execute the processing of the partition management system 100 can be included, for example, as part of utility software, a hard disk driver, a library for development, or the like. Such a program can be recorded in a storage medium, such as a CD-ROM and a DVD-ROM, and distributed to users. Alternatively, The program can be distributed over a communication line.

In this embodiment, for specifying a sector as a unit of a recording region on the hard disk, it is determined that a logical block address (LBA) starting from 0 is used. This address makes it possible to identify any sector on the hard disk. Naturally, the present invention is not limited thereto, and there may be employed a configuration in which any sector on the hard disk is specified by designating, for example, a cylinder number, a head number and a sector number. The logical block address will be referred to as a sector number for convenience.

Figure 2:
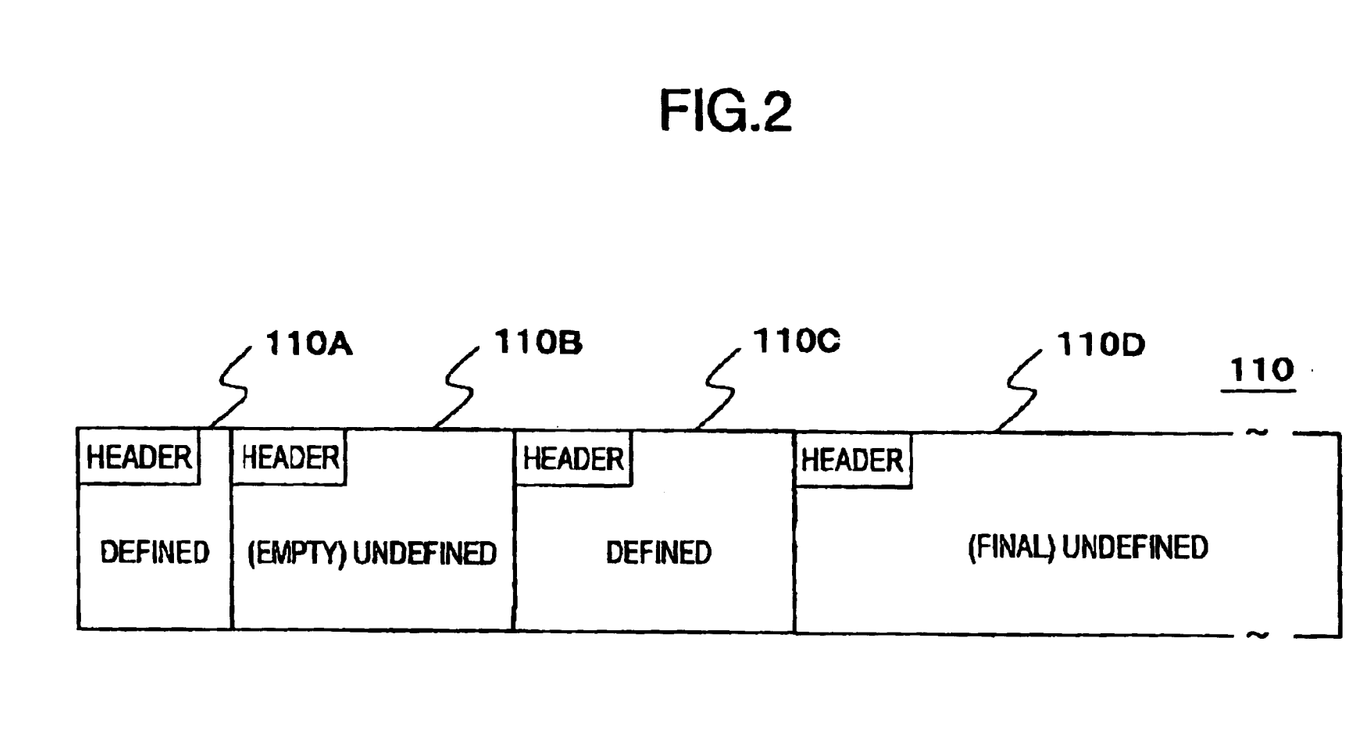
FIG. 2 is a view for explaining partitions as divisional regions of a hard disk in this embodiment.

FIG. 2 is a view for explaining partitions as divisional regions of the hard disk in this embodiment.

In the present invention, a partition created by the operator, the program under execution, or the like so that it permits reading/writing of data is referred to as a defined region (partition). A storage region in which no partition is created yet or a partition created once is deleted is referred to as an undefined region. The above undefined region will be sometimes referred to as an undefined partition for convenience.

In this drawing, four regions (110*a*, 110*b*, 110*c* and 110*d*) are formed on the hard disk 110. Of these, the regions 110*a* and 110c are defined partitions that permit reading/writing of data. The region 110b, which is present between the regions 110a and 110c, is an undefined region. The region 110d, which follows the region 110c, is an undefined region, which is assumed to continue to the end of the hard disk 110. That is, this drawing shows a state where the partition 110a and the partition 110c are created on the hard disk in an initial state.

Of the above undefined regions, an undefined region followed by a defined region or another undefined region like the region 110b is referred to as an "empty undefined region." An undefined region that is the last region of the hard disk, like the region 110d, is referred to as a "final undefined region".

Each region has a header portion having a predetermined size. Each header portion is to pre-record, for example, information to the effect that it is a head of the partition, a flag for identifying whether the partition (region) is already defined or undefined, and a size of the partition. The size of the partition can be represented, for example, by the number of sectors and the number of bytes. Alternatively, an ending sector number may be recorded to indirectly represent the size of the partition.

However, the information recorded in the header portion is not limited to the above-described information. For example, the information to the effect that the header is the head of the partition may be replaced with a leading sector number of the partition. Further, an identifier for identifying the partition, for example, a partition number may be recorded in the header portion. Furthermore, when the partition is, for example, undefined, the partition size may be set at 0 without using the above flag as the information for identifying whether the partition is already defined or undefined.

Figure 3:
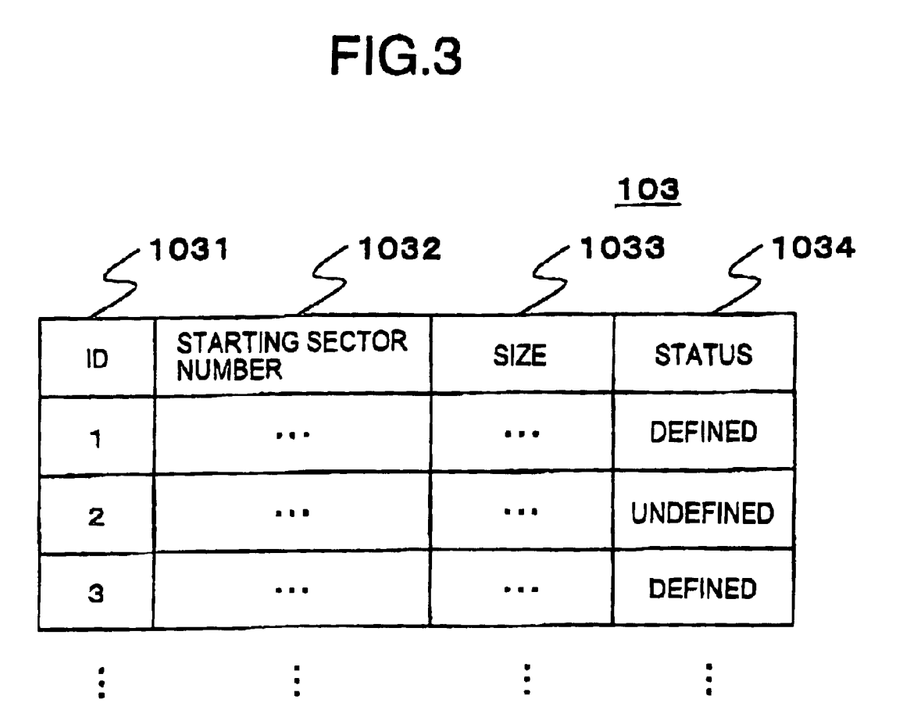
FIG. 3 is a view showing one example of a structure of a partition management table.

An operation of the partition management system 100 in this embodiment will now be explained with reference to FIG. 3. The operation of the partition management system 100 is divided into a process of creating the partition management table 103, a process of adding a partition, and a process of deleting the partition.

First, the process of creating the partition management table 103 will be explained.

The partition management table 103 is a table that is created on the main storage device, or the like, by the partition management execution unit 102 for managing information concerning the partitions on the hard disk. It is understood that FIG. 3 is a view showing one example of structure of the partition management table 103.

In this drawing, the partition management table 103 has identifiers 1031, starting sector numbers 1032, sizes 1033 and statuses 1034.

The identifiers 1031 are used for identifying the partitions, and this example uses numbers in an ascending order. The statuses 1034 are information for identifying whether the respective regions are already defined or undefined.

The partition management execution unit 102 creates the partition management table 103 when the partition management system 100 is activated, when the hard disk device is mounted on the storage device, or the like.

Specifically, the partition management execution unit 102 refers to the header portions recorded on the hard disk 110, acquires the leading sectors, acquires the sizes and the information for identifying whether the region is defined or undefined with regard to each partition (including the undefined regions), and records the same in the partition management table 103.

The partition management table 103 may be created on the hard disk, for example, at a managing region of the hard disk in advance. In this case, the partition management execution unit 102 can manage the partitions by referring to this region.

The process for adding the partitions will be explained below.

In this embodiment, the size of the partition to be added is assumed to be 2 to the n-th power times as large as a base unit. The base unit has an arbitrary size, and can be determined to be one sector (typically 512 bytes), one cluster, one kilobyte, one megabyte, one-hundred (100) megabytes, one gigabyte and the like. However, this embodiment will be described on the assumption that the base unit is one sector.

The size of the partition to be added will be any one of 1, 2, 4, 8, 16, 32, . . . , 1024, . . . sectors, which are 2 to the n-th power times as large as one sector. For simplicity, in the following explanation, sizes are represented without the unit "sector". Further, the size of the partition to be added is not limited to the size that is 2 to the n-th power times as large, and can be a size that is any natural number to the n-th power times as large, for example, 3 to the n-th power, 4 to the n-th power times as large.

Even when a substantially necessary partition size is, for example, 3, therefore, the partition size which this system is requested to add is 4, which is 2 to the second power ($2^1 \leq 3 < 2^2$). Similarly, when 1000 is necessary, 1024 ($2^{10}$) becomes a size to be added by request. Naturally, this judgment may be made with a program or the like making such a request. Alternatively, there may be employed a configuration in which the interface unit 101 is imparted with a judgment function, and for example, when the interface unit 101 receives a request to add a partition having a size of 5, a partition having a size of 8 as a minimum additional size sufficient for satisfying the request is added. For simplicity, this embodiment will be explained on the assumption that the size 2 to the n-th power times as large is requested of this system.

In this embodiment, a position where the partition can be located when created, that is, the position that can be set as a starting position of the partition, is limited to a position (sector number) where the partition size is aligned.

Specifically, if a requested partition has a size of 256 ($2^8$) sectors, the location where this partition can be located is limited to regions with sector numbers 0, 256, 512, 768. . . (m times 256) as starting positions, where the partition size is aligned. Further, when the size of a partition is, for example, 1 as 2 to 0-th power, the partition can be positioned at any sector number.

Based on the foregoing, the interface unit 101 requests the partition management execution unit 102 to execute the addition of the partition upon receipt of a request to add the partition and the size of the partition to be added. The processing of the partition management execution unit 102 having received this request will be explained with reference to the flowchart of FIG. 4.

Figure 4:
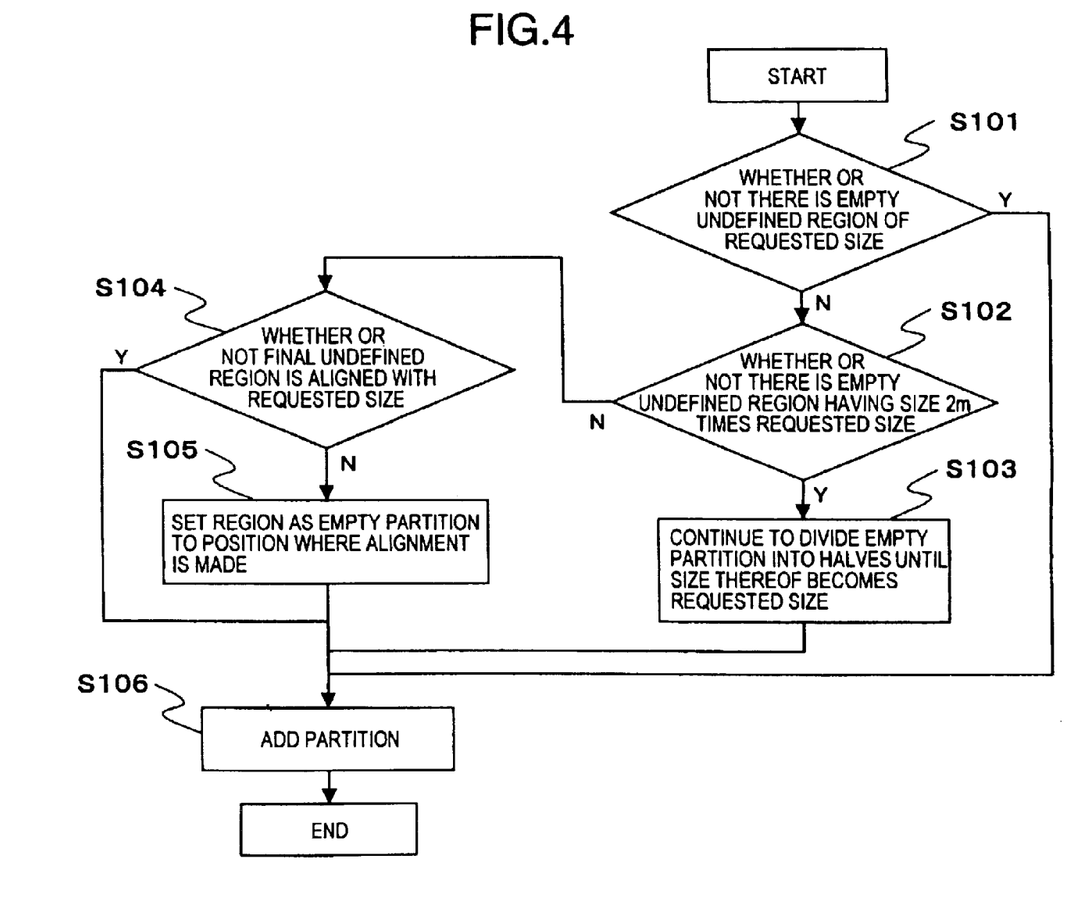
FIG. 4 is a flowchart for explaining a process for creating the partition.

First, the partition management execution unit 102 refers to the partition management table 103, and checks whether or not an empty undefined region equal to the requested size exists (S101).

If an empty region exists, the partition management execution unit 102 creates a partition at the requested size in the empty region (S106), and reports the creation of the partition to a requester through the interface unit 101. Further, the partition management execution unit 102 updates the partition management table 103 on the basis of the location and the size of the created partition, and creates a header portion of the partition of the hard disk 110.

Since the empty undefined region having the requested size is always aligned with the requested size by processing to be described later, it is possible to dispose a partition having the concerned size in this empty region.

When no empty region exists, as is determined by checking whether or not there is an empty undefined region having the requested size, the partition management execution unit 102 checks whether or not there is an empty undefined region having a size 2m times (2, 4, 6, 8. . . ) the requested size (S102).

If an empty undefined region having the size 2m times the requested size exists, the partition management execution unit 102 continues to divide the empty undefined region into halves until the empty undefined region has the requested size, and creates new regions (S103). And when a region having the requested size is created, the partition management execution unit 102 creates a partition in the region (S106). Meanwhile, the partition management execution unit 102 updates the partition management table 103 with other newly created region as empty undefined regions, and creates a header portion.

Figure 5A:
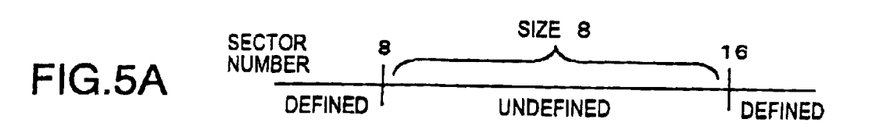
FIGS. 5A–5D are views for explaining an example of a process for creating the partition.

FIGS. 5A–5D are views for explaining one example of the above processing. These drawings show an example of the case where the creation of a partition having a size 2 is requested in a state where a sector number 8 has an empty undefined region having a size 8 (FIG. 5A).

Figure 5B:
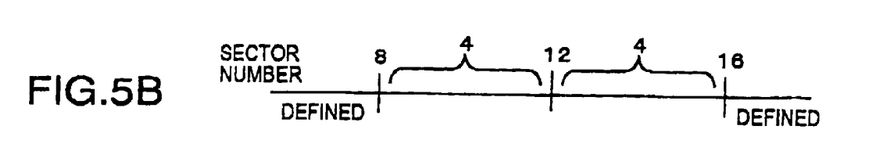
Figure 5C:
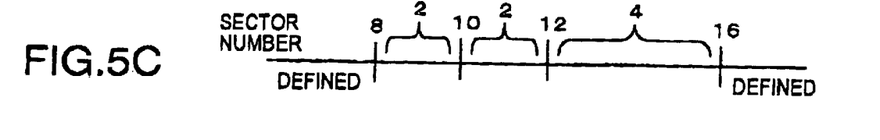

Since the empty undefined region having the size 8, which starts from the sector number 8, is 4 times as large as the requested size 2, this region meets the condition of 2m times. First, this region is divided into halves. Then, two empty undefined regions having a size 4 each are created (FIG. 5B). An empty undefined region having a lower sector number is further divided into halves. Then, two empty undefined regions having a size 2 each are created (FIG. 5C).

Figure 5D:
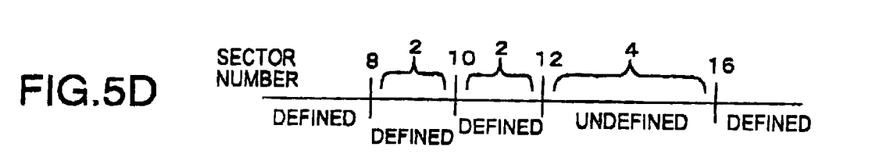

Since these empty undefined regions have a size equal to the requested size, the partition is created in an empty undefined region having the size 2 and having a lower sector number. The partition management execution unit 102 updates the partition management table 103 with other newly created regions as empty undefined regions, and creates and updates a header (FIG. 5D).

When there is not an empty undefined region having a size 2m times as large as the requested size, as is determined by checking whether or not there is an empty undefined region 2m times as large, the partition management execution unit 102 checks whether or not the final undefined region is aligned with the requested size (S104).

As a result, when the final undefined region is aligned with the requested size, the partition management execution unit 102 creates the partition at the requested size from a starting position of the final undefined region (S106). The partition management execution unit 102 sets a remaining region as a final undefined region.

When the final undefined region is not aligned with the requested size, the partition management execution unit 102 creates an empty undefined region to a position where alignment is made (S105), and creates the partition at the requested size therein (S106).

Figure 6A:
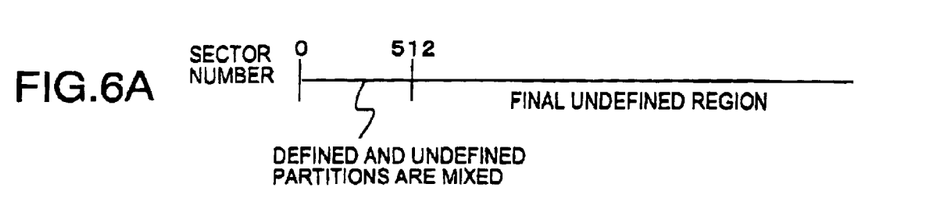
FIG. 6 is a view for explaining a process for creating the partition in a final undefined region.
Figure 6B:
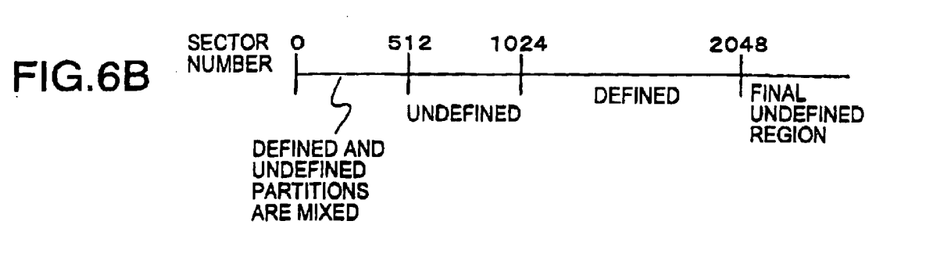

FIG. 6 is a view for explaining one example of the above processing. This example is an example of the case where a partition with a size 1024 is requested when the final undefined region starts from a sector number 512 (FIG. 6A). Since the size 1024 is not aligned with the sector number 512 as a starting position of the final defined region, the partition management execution unit 102 sets a region from the sector number 512 up to and including the sector number 1023 as an empty undefined region, and creates the partition with the size 1024 at the sector number 1024. Furthermore, the partition management execution unit 102 sets, as a final undefined region, a region of a sector number 2048 and thereafter, which region is a remaining region (FIG. 6B). The partition management execution unit 102 updates the partition management table 103, and creates and updates a header portion.

The partitions are created as described above, so that the partitions can be disposed in the positions aligned with the requested sizes.

Figure 7:
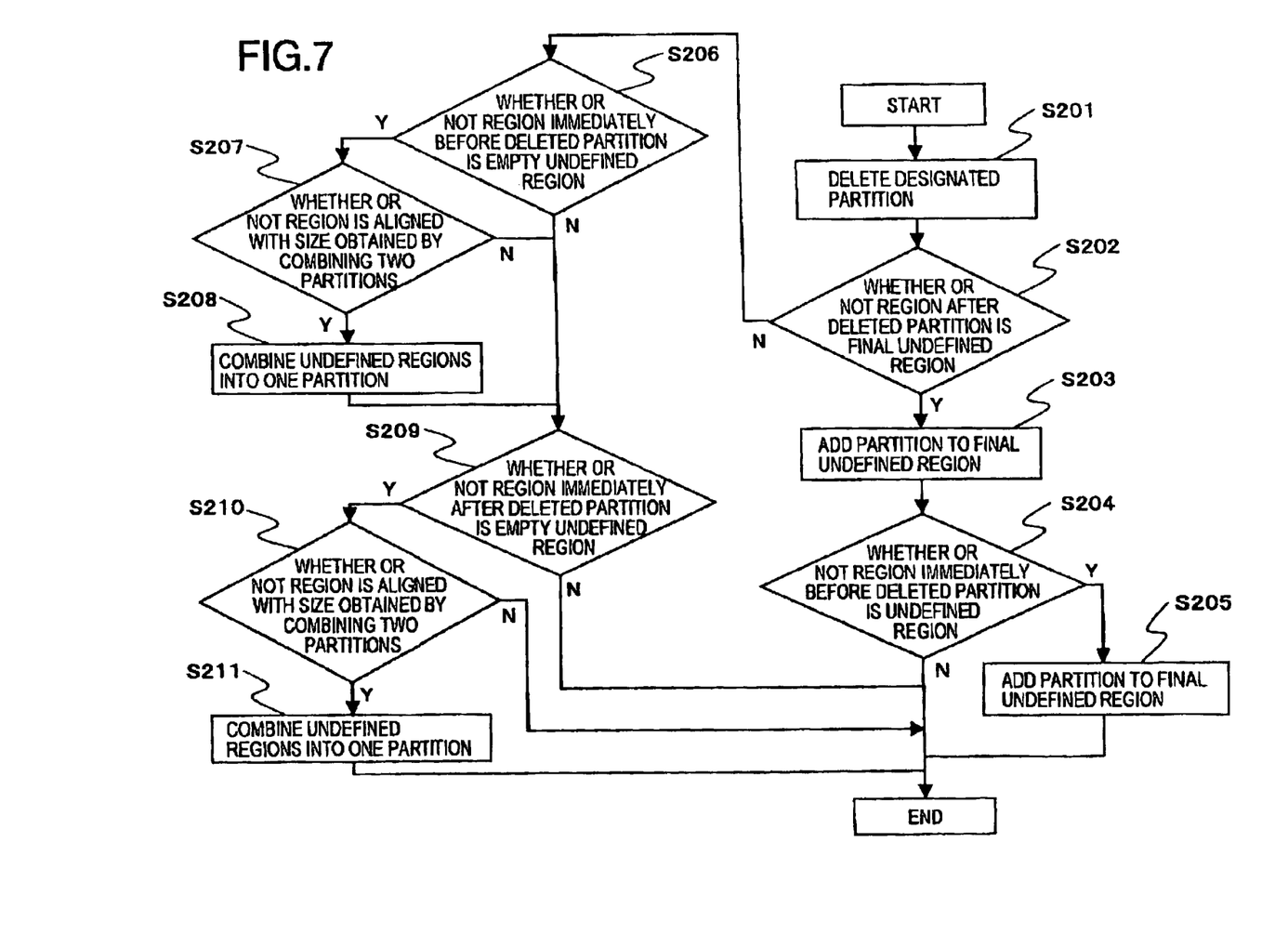
FIG. 7 is a flowchart for explaining a process for deleting the partition.

The processing of deleting a partition will be explained with reference to a flowchart of FIG. 7.

The interface unit 101 of the partition management system 100 requests that the partition management execution unit 102 delete a partition upon receipt of a deletion request designating a specified partition from an operator, the program under execution, or the like.

The method of designating a partition to be deleted can be a method of designating an identifier such as a starting sector number, a partition number, or the like, of the partition. Naturally, the present invention is not limited to such a method, and the partition to be deleted can be specified by information to which the partition management execution unit 102 can refer and which permits designation of the partition to be deleted.

First, the partition management execution unit 102 deletes the designated partition, and sets a region thereof as an undefined region (S201).

Then, the partition management execution unit 102 judges whether or not the deleted partition is the last one of the defined partitions, that is, whether or not a region immediately after the deleted partition has been the final undefined region (S202).

When the deleted partition has been the last partition, the partition management execution unit 102 incorporates the undefined region caused by such deletion into the final undefined region (S203). Further, the partition management execution unit 102 judges whether or not a region immediately before the deleted partition has been an empty undefined region (S204), and when the region is an empty undefined region, the partition management execution unit 102 also incorporates the region into the final undefined region (S205).

On the other hand, when the deleted partition is not the last partition, the partition management execution unit 102 judges whether or not a region immediately before the region that has been set as an undefined region is an empty undefined region (S206). When that region is an empty undefined region, the partition management execution unit 102 judges whether or not the region is aligned when the two undefined regions are combined (S207), and when the region can be aligned, the two undefined regions are combined and set as one undefined region (S208).

Further, the partition management execution unit 102 judges whether or not a region immediately after the empty undefined region caused by the deletion or the empty undefined region caused by such combination is an empty undefined region (S209). Then, when the region is an empty undefined region, the partition management execution unit 102 judges whether or not the region can be aligned when the two undefined regions are combined (S210), and when the region can be aligned, the two undefined regions are combined and set as one undefined region (S211).

Then, the partition management execution unit 102 reports the deletion of the partition to the requester through the interface unit 101. Further, the partition management execution unit 102 updates the header portion of each partition and the partition management table 103, and terminates the processing of deleting the partition.

FIGS. 8A–8G are views for explaining examples of the above processing. When a partition D is deleted in FIG. 8A, a region immediately after the region from which the partition D is deleted is the final undefined region, so that the region from which the partition D has been deleted is added to the final undefined region as shown in FIG. 5B (S203)

Figure 8A:
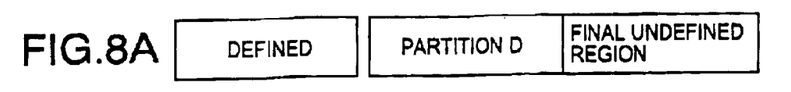
FIGS. 8A–8G are views for explaining examples of processes for deleting the partition.
Figure 8B:
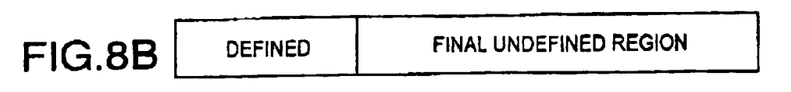
Figure 8C:
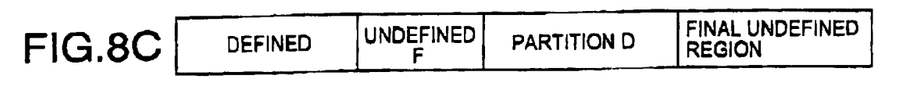
Figure 8D:
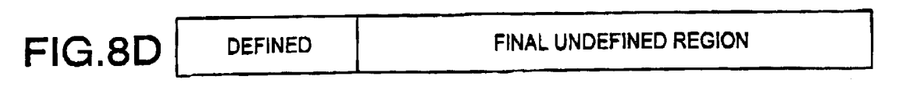

When a partition D is deleted in FIG. 8C, the region from which the partition D is deleted is added to the final undefined region. In this case, a region immediately before that region is an undefined region F, so that the undefined region F is also added to the final undefined region as shown in FIG. 8D (S205).

Figure 8E:
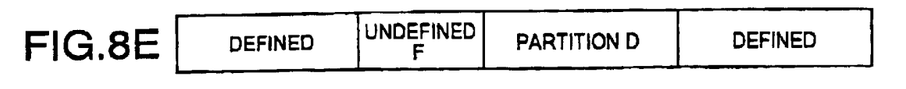
Figure 8F:
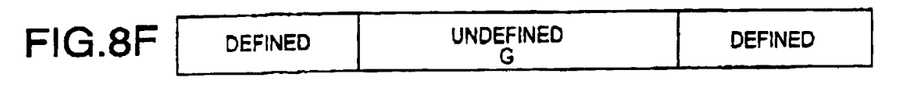
Figure 8G:
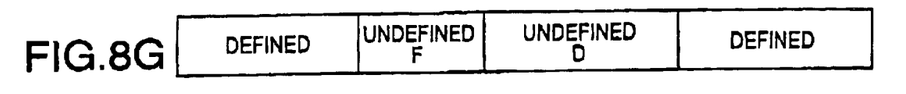

When a partition D is deleted in FIG. 8E, if the total size of a region from which the partition D is deleted and an undefined region F immediately before that region can be aligned, these two partitions are combined to be set as one undefined region G as shown in FIG. 8F (S208). On the other hand, if the total size cannot be aligned, two undefined regions, namely, an undefined region D (as a result of deleting the partition D) and an undefined region F are generated as shown in FIG. 8G.

With a partition size limited to 2 to the n-th power, simulations of utilization efficiencies of the hard disk have been conducted with regard to: a case (A), where the partition is disposed only at the position aligned with the partition size; and a case (B), where the partition is disposed at an arbitrary position below.

The above simulations were conducted using the following method: 50 partitions having eight sizes of 8 megabytes, 16 megabytes, 32 megabytes, 64 megabytes, 128 megabytes, 256 megabytes, 512 megabytes and 1 gigabyte were pre-created on the hard disk at random; processes (1) to (3), shown below, were iterated 1000 times while changing types of random numbers; and states of the hard disk were compared.

(1) Deleting one partition by use of random numbers;
(2) Selecting any one of the above-described eight sizes by use of the random numbers, and adding a partition of the size; and
(3) Iterating processes (1) and (2) 100 times.

As a result of the simulations, the total number of sectors to the last partition (total number of sectors) and percentages of empty regions included in the total sectors to the last partition (empty/total) were determined as shown in Table 1 below.

TABLE 1

|  | A | B |
| --- | --- | --- |
| Total Number of Sectors | 35,287,040 | 33,820,672 |
| Empty/Total | 25.95% | 21.78% |

The above simulation results show that the present invention improves the utilization efficiency of the hard disk.

As described above, the utilization efficiency of the storage device can be improved according to the present invention.

Although the invention herein has been described whit reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for creating a partition in a storage device, the method comprising:

receiving a request to create a partition having a requested size of 2 to n-th power, where n is a natural number, referring to a table containing disposition information of partitions in the storage device, determining whether there is an empty region in the storage device having a size equal to the requested size based on the disposition information and, if so, disposing the partition in that empty region, when an empty region having the requested size does not exist, determining, based on the disposition information, whether there is an empty region having a size 2k times as large as the requested size (where k is a natural number) and, if so, performing the steps of:

a) dividing that empty region in half to obtain two divided empty regions;

b) when the size of one of the divided empty regions is equal to the requested size, disposing the partition in the one divided empty region of the storage device;

c) when the size of each of the divided empty regions is at least twice as large as the requested size, assigning a single one of the divided empty regions obtained in step a) as the empty region; and d) repeating steps a) through c) only as to the single divided empty region assigned in step c) until the size of one of the divided empty regions obtained by repeating step a) is equal to the requested size and the partition is disposed in the one divided empty region; and disposing the partition in a region where a partition can be created, the region being a position that can be aligned with the requested size when there is neither a region having the requested size nor a region having 2k times the requested size.

2. The method according to claim 1, wherein the step of receiving the request to create a partition includes receiving a request to create a partition of an arbitrary size, and adopting, as the requested size, a size of 2 to the n-th power, where n is at a minimum that meets the size of the received request.

3. A method of managing one or more partitions of a storage device comprising the method for creating a partition as claimed in claim 1, said method of managing further comprising:

receiving information specifying a partition to be deleted; and referring to a table containing disposition information concerning the partition in the storage device, and determining whether a region before or after the partition to be deleted is an empty region, and whether a region obtained by combining the empty region and the partition to be deleted can be aligned with a total size of the empty region and the partition to be deleted, and, if so, combining the empty region and a region having the partition deleted therefrom.

4. A storage medium containing a computer program for causing a computer to execute actions comprising:

receiving a request to create a partition having a requested size of 2 to n-th power, where n is a natural number; and referring to a table containing disposition information concerning a partition in a storage device, determining whether there is an empty region in the storage device having a size equal to the requested size based on the disposition information and, if so, disposing the partition in that empty region, when an empty region having the requested size does not exist, determining, based on the disposition information, whether there is an empty region having a size 2k times as large as the requested size (where k is a natural number) and, if so, performing the steps of:
a) dividing that empty region in half to obtain two divided empty regions;
b) when the size of one of the divided empty regions is equal to the requested size, disposing the partition in the one divided empty region of the storage device;
c) when the size of each of the divided empty regions is at least twice as large as the requested size, assigning a single one of the divided empty regions obtained in step a) as the empty region; and
d) repeating steps a) through c) only as to the single divided empty region assigned in step c) until the size of one of the divided empty regions obtained by repeating step a) is equal to the requested size and the partition is disposed in the one divided empty region; and disposing the partition in a region where a partition can be created, the region being a position aligned with the requested size when there is neither a region having the requested size nor a region having 2k times the requested size.

5. The storage medium according to claim 4, wherein the step of receiving the request to create a partition includes receiving a request to create a partition of an arbitrary size, and adopting, as the requested size, a size of 2 to the n-th power, where n is at a minimum that meets the size of the received request.

6. A storage medium as claimed in claim 4, wherein said computer program is further executable to cause the computer to execute a process including:

receiving information specifying a partition to be deleted; and referring to a table containing disposition information concerning the partition in the storage device, and determining whether a region before or after the partition to be deleted is an empty region, and whether a region obtained by combining the empty region and the partition to be deleted can be aligned with a total size of the empty region and the partition to be deleted, and, if so, combining the empty region and the region having the partition deleted therefrom.

7. An information processing apparatus, comprising:

means for receiving a request to create a partition having a requested size of 2 to n-th power, where n is a natural number; and means for referring to a table containing disposition information concerning partitions in a storage device, for determining whether there is an empty region in the storage device having a size equal to the requested size, and for disposing the partition in that empty region, means for determining based on the disposition information, when an empty region having the requested size does not exist, whether there is an empty region having a size 2k times as large as the requested size (where k is a natural number) and, if so, for performing the steps of:
a) dividing that empty region in half to obtain two divided empty regions;
b) when the size of one of the divided empty regions is equal to the requested size, disposing the partition in the one divided empty region of the storage device;
c) when the size of each of the divided empty regions is at least twice as large as the requested size, assigning a single one of the divided empty regions obtained in step a) as the empty region; and
d) repeating steps a) through c) only as to the single divided empty region assigned in step c) until the size of one of the divided empty regions obtained by repeating step a) is equal to the requested size and the partition is disposed in the one divided empty region; and means for disposing the partition in a region where a partition can be created, the region being a position aligned with the requested size, when there is neither a region having the requested size nor a region having 2k times as large as the requested size.

8. The information processing apparatus according to claim 7, wherein said means for receiving a request is operable to receive a request to create a partition of an arbitrary size, and to adopt, as the requested size, a size of 2 to the n-th power, where n is at a minimum that meets the size of the received request.

9. An information processing apparatus as claimed in claim 7, said information processing apparatus further comprising:

means for receiving information for specifying a partition to be deleted; and means for referring to a table containing disposition information concerning the partition in the storage device, and when a region before or after the partition to be deleted is an empty region, and if a region obtained by combining the empty region and the partition to be deleted is aligned with a total size of the empty region and the partition to be deleted, for combining the empty region and the region having the partition deleted therefrom.

10. A storage device having a partition that is created according to a method comprising:

receiving a request to create a partition having a requested size of 2 to n-th power, where n is a natural number, referring to a table containing disposition information of partitions in the storage device, determining whether there is an empty region in the storage device having a size equal to the requested size based on the disposition information and, if so, disposing the partition in that empty region, when an empty region having the requested size does not exist, determining, based on the disposition information, whether there is an empty region having a size 2k times as large as the requested size (where k is a natural number) and, if so, performing the steps of:
a) dividing that empty region in half to obtain two divided empty regions;
b) when the size of one of the divided empty regions is equal to the requested size, disposing the partition in the one divided empty region of the storage device;
c) when the size of each of the divided empty regions is at least twice as large as the requested size, assigning a single one of the divided empty regions obtained in step a) as the empty region; and d) repeating steps a) through c) only as to the single divided empty region assigned in step c) until the size of one of the divided empty regions obtained by repeating step a) is equal to the requested size and the partition is disposed in the one divided empty region; and disposing the partition in a region where a partition can be created, the region being a position that can be aligned with the requested size when there is neither a region having the requested size nor a region having 2k times the requested size.

11. The storage device of claim 10, wherein the step of receiving the request to create a partition includes receiving a request to create a partition of an arbitrary size, and adopting, as the requested size, a size of 2 to the n-th power, where n is at a minimum that meets the size of the received request.

* * * * *